April 2, 1968   F. P. HODGES ETAL   3,375,715
SEA DIRECTION INDICATOR

Filed Nov. 10, 1965   3 Sheets-Sheet 1

INVENTORS
John W. Luce
and Frank P. Hodges
BY
ATTORNEY

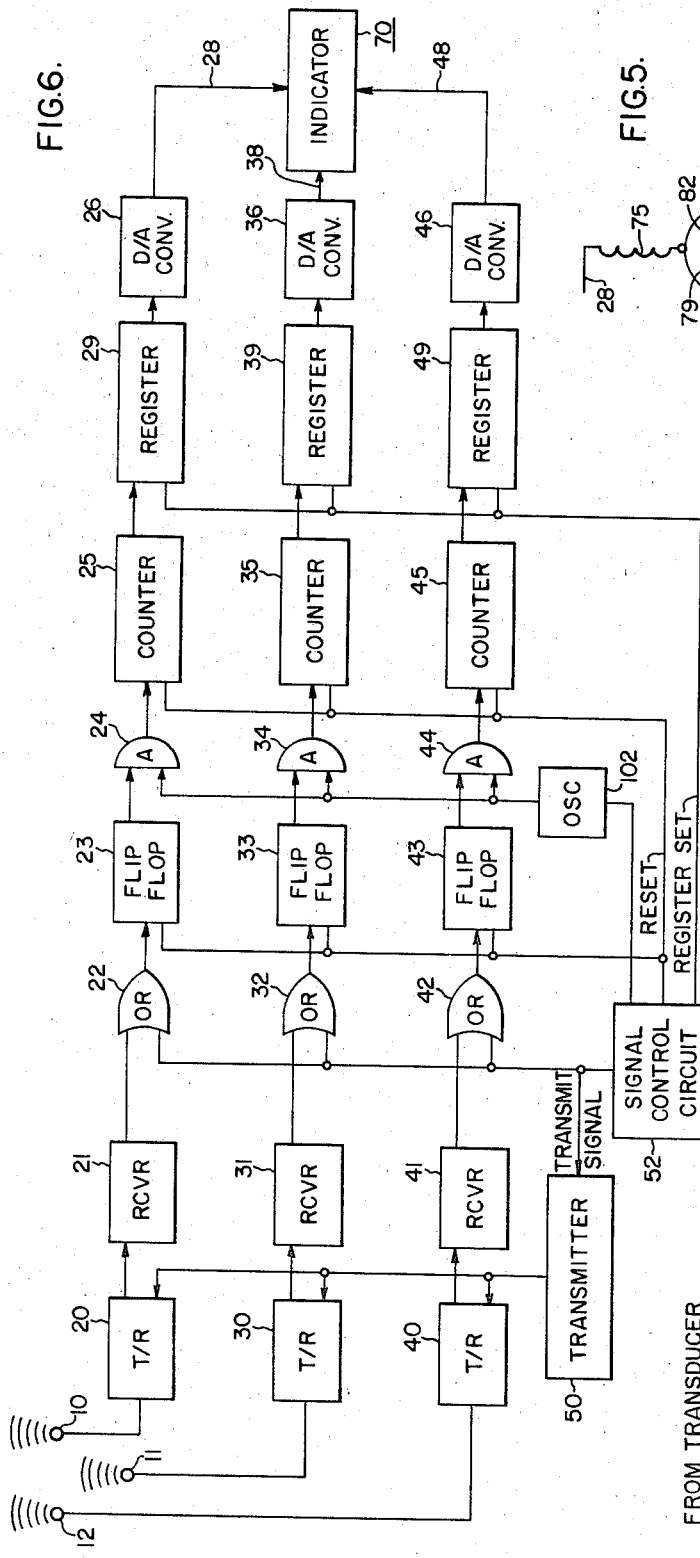
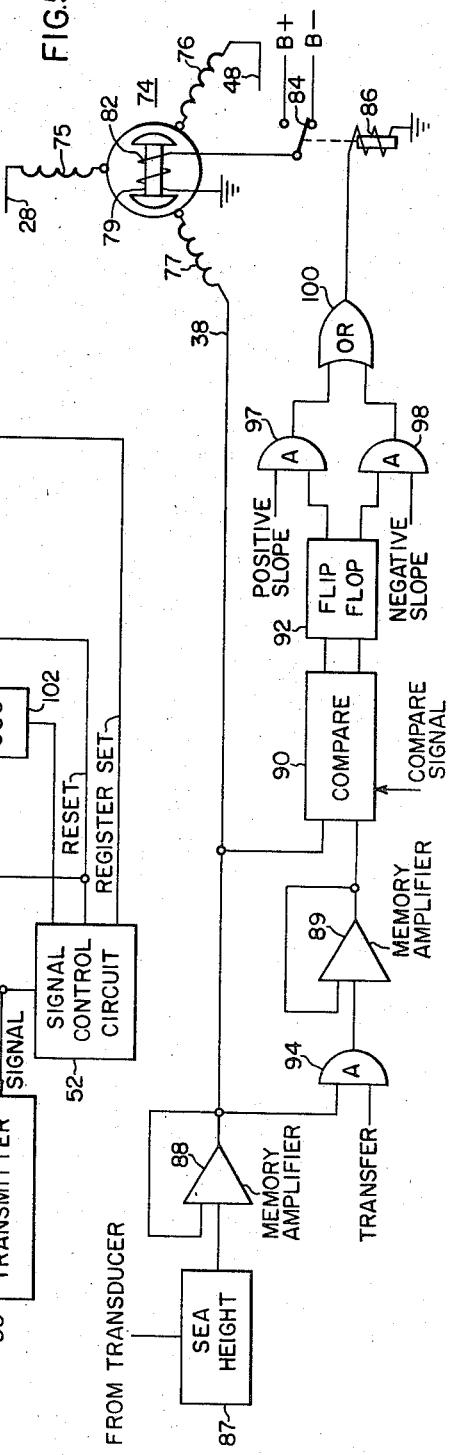

United States Patent Office 3,375,715
Patented Apr. 2, 1968

3,375,715
SEA DIRECTION INDICATOR
Frank P. Hodges, Baltimore, and John W. Luce, Arnold, Md., assignor to Westinghouse Electric Corporation, Pittsburgh, Pa., a corporation of Pennsylvania
Filed Nov. 10, 1965, Ser. No. 507,149
13 Claims. (Cl. 73—170)

ABSTRACT OF THE DISCLOSURE

A device for measuring the slope of a portion of the sea surface including a plurality of transducers each of which directs a narrow beam acoustic signal toward the sea surface from below the sea surface. The return acoustic signals are utilized to indicate the slope of the sea surface above the transducers.

This invention in general relates to oceanographic instrumentation systems, and more particularly to a sea direction indicator.

Often, the crew of an underwater vessel such as a submarine or underwater research vehicle desires to know not only the state of the sea above the vehicle but also the directional orientation of the waves, that is, sea direction.

One method to obtain an indication of sea direction utilizes a transducer or a plurality of transducers in a linear array for sending acoustic signals toward the sea surface for obtaining the wave height above the transducers. The vessel then travels in a predetermined course, generally circular in nature, to observe the variations in wave height. This method of obtaining sea direction is extremely time consuming and many times, very inaccurate.

Other applications where it is desired to know sea direction include oceanographic studies as well as civil engineering studies relative to harbors, rivers, etc. For these applications sea state and sea direction information may be telemetered or directly connected with a central processing station, and for unattended operation it is seen that movement of the transducer or transducers in a circular course would be extremely expensive and complicated.

It is therefore one object of the present invention to provide improved apparatus for indicating sea direction.

Another object is to provide apparatus for indicating sea direction which eliminates the need to travel in a prescribed course.

A further object is to provide a sea direction indicator which may be utilized by an underwater submersible or may be placed at a point in the water for monitoring sea direction.

Another object is to provide a sea direction indicator which may operate from relatively deep ocean depths.

In ocean surface waves, the wave crests and troughs lie perpendicular to the direction of propagation of the waves. The direction of the greatest slope of the water surface therefore lies in the same direction that the waves are propagating. In accordance with the above objects the broad concept of the invention comprises means for determining the direction of the greatest slope of the water surface by examining the phase difference of the wave as it passes over a plurality of different points.

The objects and the basic concept are accomplished in the present invention, one illustrative embodiment of which comprises a plurality of transducers, and preferably three transducers in a triangular array, each for directing a narrow beam acoustic signal toward the sea surface from below the sea surface. The return acoustic signals give an indication of the relative height of the sea above the transducers. Means are provided for obtaining a plurality of analog voltages proportional to the difference in times of arrival of the return signals which in turn is indicative of the difference in heights of the sea above the respective transducers. These analog voltages are then utilized to obtain sea direction since they are indicative of the phase difference, or the slope of the sea above the transducers.

The sea direction may be provided by indicator means preferably in the form of a synchro generator having a plurality of windings with each winding receiving a respective analog voltage.

The above stated, as well as further objects and advantages, will become apparent upon a reading of the following detailed specification taken in conjunction with the drawings, in which:

FIG. 5 illustrates the indicator of FIG. 4 in more detail; and

FIG. 6 illustrates another embodiment of the present invention.

Figure 1:
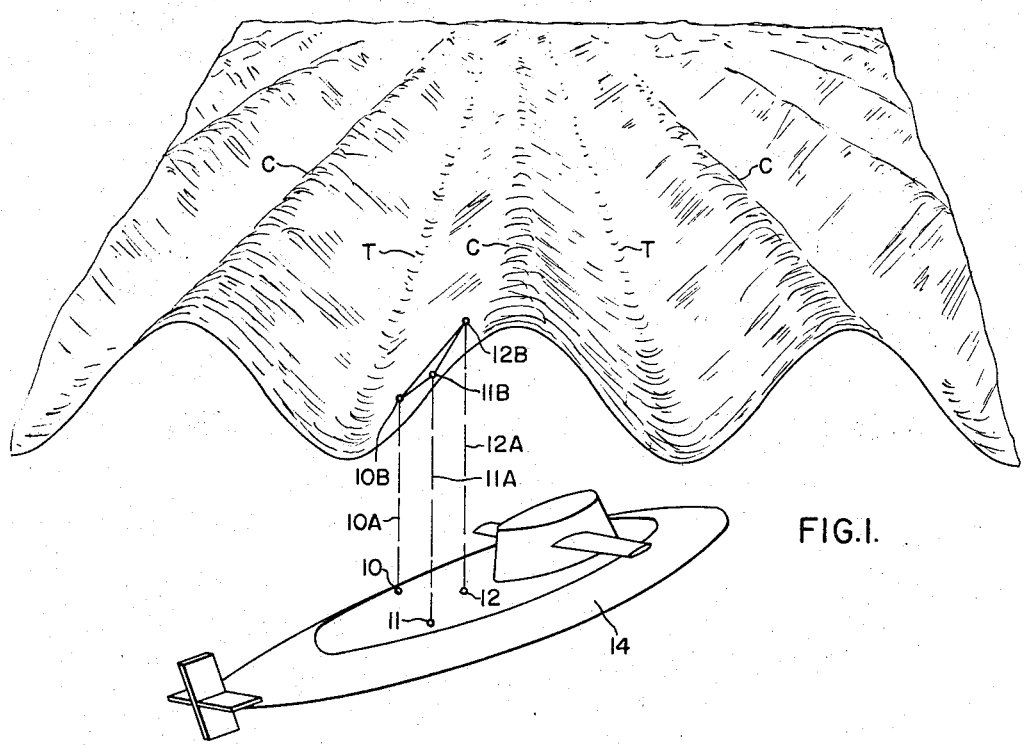
FIGURE 1 illustrates a typical environment for the sea direction indicator apparatus.

Referring now to FIG. 1, there is shown three upward looking transducers 10, 11 and 12 in a geometric array on the deck of submerged submarine 14. The geometric array is preferably an equilateral triangle.

A section through the sea surface shows it to be undulating and periodic, and is assumed to be sinusoidal. For all practical purposes in the practice of the invention herein, this is a reasonable assumption. The wave crests are defined by the lines C and the wave troughs by the lines T. C and T are parallel to one another and both are perpendicular to the sea direction.

Each of the transducers 10, 11 and 12 when properly energized produces a narrow beam acoustic signal directed toward the sea surface. In FIG. 1 only the beam axes 10A, 11A and 12A are illustrated. The transducers 10, 11 and 12 are arranged such that the beam axes are all parallel to one another although angular displacements are possible. The acoustic signal provided by transducer 10 impinges upon the sea surface at an area 10B; the acoustic signal provided by transducer 11 impinges upon the sea surface at area 11B; and the acoustic signal provided by transducer 12 impinges upon the sea surface at area 12B. The actual impingement area depends upon the beam width and depth of the submarine 14. Transducers have been produced which provide a beam width of a few tenths of a degree and are applicable in the present invention. After impinging upon the sea surface, the acoustic beams will be reflected back down to the transducers in the form of return signals. Since the impingement areas 10B, 11B and 12B are of finite size, the leading edge of the return signal may be utilized for detection purposes. In other words, the portion of the impingement area closest to the respective transducer will be indicative of the height of the sea above that transducer. A better understanding of the relationship of the sea with respect to the transducers may be had by referring to FIGS. 2 and 2A, 3 and 3A.

Figure 2:
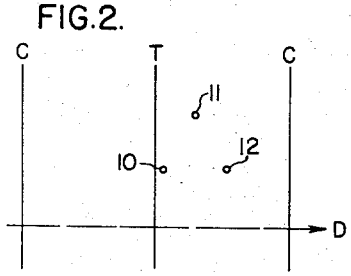
FIG. 2 is a schematic illustration of a wave passing over three transducers as viewed from above.
Figure 2A:
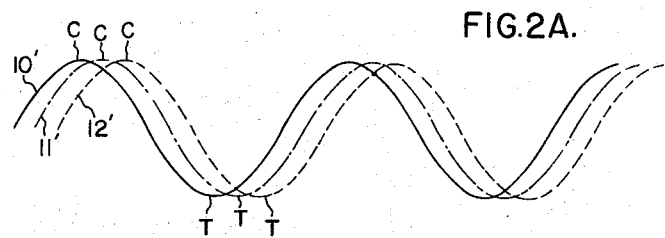
FIG. 2A is the resultant wave profile signals which would be provided by the arrangement of FIG. 2.

FIG. 2 is a view looking down on the transducers 10, 11 and 12 with the sea moving in the direction of the arrow D. The sea crests and troughs are represented by the lines labeled C and T. As a crest passes over a transducer, a maximum distance or peak is experienced, and when a trough passes over the transducer a minimum point is provided. FIG. 2A illustrates this principle and shows three wave profile signals 10', 11' and 12' which would be provided by transducers 10, 11 and 12 respectively, were they to obtain a continuous indication of sea height above the transducers. A crest passing over transducer 10 produces a peak on the wave 10'; this same crest passing over transducer 11 produces a peak on the wave 11' a short time later; and the same crest passing over transducer 12 produces a peak on wave 12' some time later. A trough passing over the transducers produces three minimum points. With the sea direction parallel to a line drawn between two transducers (in FIG. 2 the direction D is parallel to a line drawn through transducers 10 and 12) the phase of the wave signals are as illustrated in FIG. 2A. Conversely, it may be stated that with the wave profile signals having the relative phases as illustrated in FIG. 2A it may be determined that the sea is traveling in the direction of the arrow D. In the present invention some indication of these wave profile signals are obtained and then the sea direction is determined therefrom.

Figures 3, 3A:
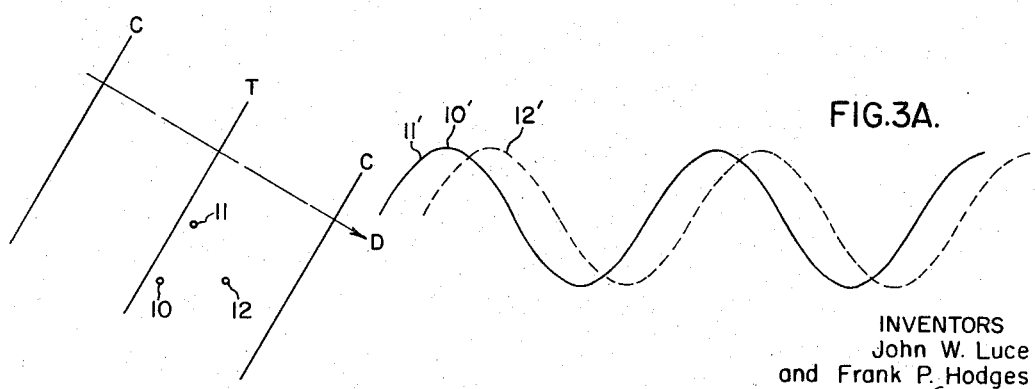
FIG. 3 is similar to FIG. 2 with a different sea direction.
FIG. 3A is the resultant wave profile signals obtained from the arrangement of FIG. 3.

In FIG. 3 there is illustrated a situation wherein the sea direction (arrow D) is perpendicular to a line drawn through two transducers (10 and 11). The resulting wave profile signals are illustrated in FIG. 3A and it is seen that the wave profile signals 10' and 11' are identical since a wave crest passes over transducers 10 and 11 at the same time, as does a wave trough.

If the transducers provided wave profile signals as in FIG. 3A, one would know that the sea direction was as indicated in FIG. 3. The sea direction with respect to the submarine would also be known since the orientation of transducers on the submarine deck are known. Other sea directions varying between that shown in FIG. 2 and FIG. 3 would provide three wave profile signals varying in phase between that illustrated in FIG. 2A and that illustrated in FIG. 3A, and for other or oppositely directed sea directions the wave profile signals would look the same, however, not in the order shown.

Figure 4:
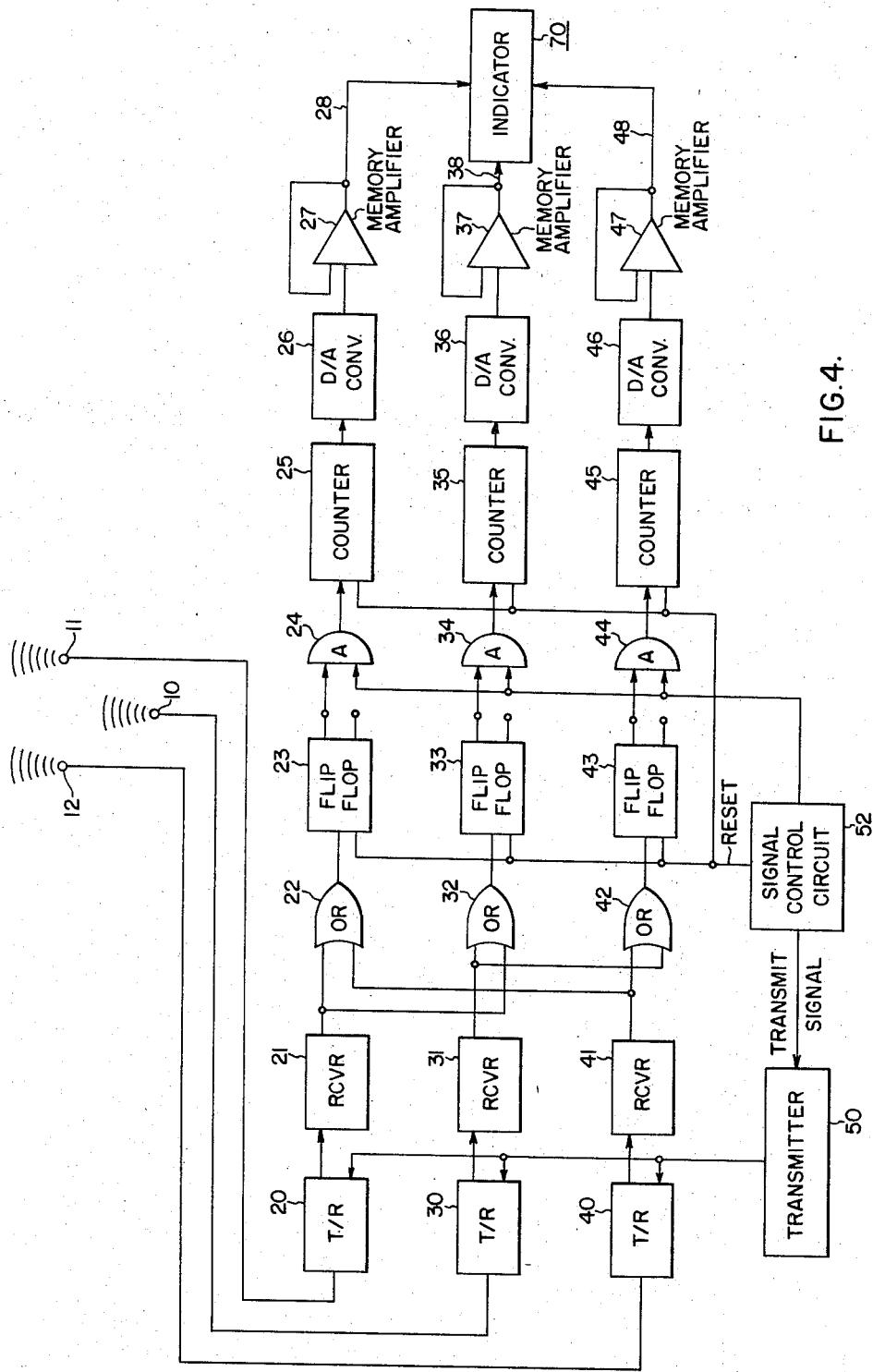
FIG. 4 is a block diagram of an embodiment of the present invention.

In FIG. 4 there is illustrated an embodiment of the present invention wherein an indication of the relative phase difference between the profile signals 10', 11' and 12', and the sea direction, are obtained by periodically obtaining the difference in heights of the sea surface above the transducers. This would in essence be equivalent to measuring the vertical distance periodically between wave signals 10' and 11', 11' and 12', and 10' and 12'. In FIG. 4 transmitter 50 supplies, upon a transmit signal from signal control circuit 52, a high voltage pulse to the transducers 10, 11 and 12 through T/R (transmit/receive) switches 20, 30 and 40. The transducers may be designed to be resonant at different frequencies, for example 200 kc., 250 kc. and 300 kc. for transducers 10, 11 and 12, respectively, so that crosstalk between received pulses is eliminated. The high voltage pulse supplied to the transducers may be in the order of 600 volts and the signal control circuit 52 may supply transmit signals to the transmitter at a repetition frequency of several pulses per second.

The return signals impinging upon transducers 10, 11 and 12 produce corresponding electrical signals, in a well-known manner, which are detected by receivers 21, 31 and 41 after passage through T/R switches 20, 30 and 40. The first gating means in the form of OR gates 22, 32 and 42 receive different combinations of output signals provided by the receivers for triggering flip-flops (bistable multivibrator) 23, 33 and 43. The flip-flops are of the type wherein successive input pulses switch the flip-flop between stable states of operation corresponding to on and off periods or modes of operation. The upper right-hand lead of the flip-flops 23, 33 and 43 constitute an output lead which will deliver an output signal when the flip-flop is in an on condition. Second gating means in the form of AND gates 24, 34 and 44 are responsive to an enabling signal which may be provided by the signal control circuit 52 for passing the output signals provided by flip-flops 23, 33 and 43 to counters 25, 35 and 45.

The operation of the apparatus thus far described is as follows. Assume that the sea has a direction relative to the transducers as illustrated in FIG. 2 and that a first return signal is received by transducer 10, a second return signal is received by transducer 11 and a third return signal is received by transducer 12, in that order. These return signals were provided as a result of transmitter 50 providing each of these transducers with a high-voltage pulse. Since return signals are received by transducers 10, 11 and 12 in the order named, receiver 21 will be the first to provide an output signal, receiver 31 will be the second to provide an output signal and receiver 41 will be the last to provide an output signal. Initially, the flip-flops and counters will be reset by a reset signal from the signal control circuit 52. The output from receiver 21 is fed through OR gates 22 and 32 to turn flip-flops 23 and 33 on. An enabling signal to AND gates 24, 34 and 44 allows AND gates 24 and 34 to pass an on signal from flip-flops 23 and 33 to counters 25 and 35, respectively, so that they may start their counting cycle. A short time later the output signal provided by receiver 31 is passed by OR gates 32 and 42 to thereby flip-flop 33 off and flip-flop 43 on. With flip-flop 33 turned off, counter 35 stops and with flip-flop 43 turned on, the on signal is passed through AND gate 44 to turn counter 45 on.

At this point the count in counter 35 is indicative of the distance between the heights of the sea over transducer 11 and transducer 10. In other words, the vertical distance between impingement area 10B and 11B of FIG. 1. At this time counters 25 and 45 are still counting. When receiver 41 provides its output signal, it is passed by OR gates 22 and 42 to turn off flip-flops 23 and 43 thereby stopping counters 25 and 45. The count in counter 45 therefore is indicative of the vertical distance between impingement areas 11B and 12B and the count in counter 25 is indicative of the vertical distance between impingement areas 10B and 12B and, with these heights known, the slope of the wave face may be calculated. Otherwise stated, the count in counters 25, 35 and 45 is indicative of the vertical distance between the wave profile signals illustrated in FIG. 2A at a certain point in time. In order to translate the count in the counters into useful information, there is provided a plurality of digital-to-analog converters 26, 36 and 36 for obtaining an analog voltage of the information stored in counters 25, 35 and 45 respectively. These voltages are fed into memory amplifiers 27, 37 and 47 where they are retained until a new count is obtained.

The voltages at the outputs of memory amplifiers 27, 37 and 47 are proportional to the difference in times of arrival of the return signals back to respective transducers, which in turn is proportional to a height differential and will give an indication of sea direction. Indicator means 70 therefore is provided to compute or indicate the sea direction as by vectorially combining the memory amplifier output voltages on leads 28, 38 and 48.

The memory amplifier outputs may be stored on tape for future use, may be recorded simply as voltages, graphically as waveforms, may be fed directly to a computer in conjunction with other data or may be fed to an instrument for direct viewing of sea direction. One type of indicator means is illustrated in more detail in FIG. 5.

In FIG. 5 the indicator means includes a synchronous generator 74, commonly called a synchro or synchro generator, having a plurality of stator windings 75, 76 and 77 and a rotor member 79. Each of the windings 75, 76 and 77 has one end adapted to receive the voltage from one of the memory amplifiers of FIG. 4. The other ends of the windings are all connected together. With the voltages applied to the windings, a resultant magnetic field is produced which is a function of the magnitude and polarity, or phase of the three voltages applied to the windings. The axis of the magnetic field produced will bear the same relationship to the axes of the three windings as the sea direction has to three lines connecting the transducers. The resultant magnetic field exerts a torque on the rotor 79, turning it until it is aligned with the magnetic field at which point the torque will diminish to zero and rotation will cease. The rotor will remain in this position until the sea direction or the submarine's heading changes.

Suppose, by way of example, that the sea direction relative to the transducer is as shown in FIG. 2, that is, an east-west direction, with the sea coming from the west. Windings 75, 76 and 77 of the synchro 77, therefore, periodically receive voltages indicative of the wave profile signals of FIG. 2A and a corresponding magnetic field is set up such that rotor 79 assumes the position illustrated. The rotor 79 may be coupled in any well-known manner to a suitable indicating meter. If the waves were coming from the east rather than from the west, an opposite magnetic field would be set up but the rotor 79 would still assume the position illustrated. In some applications just the general sea direction is desired, that is, just knowing the general east-west direction of the sea is sufficient. For other applications it is desired to know from which direction the sea is coming. For applications where this information is also desired means may be provided to eliminate the 180° ambiguity of indicated direction.

One arrangement which eliminates the 180° ambiguity is shown in FIG. 5 and includes means for polarizing the synchro rotor 79 so as to properly respond to oppositely directed magnetic fields. The polarizing winding 82 on the rotor 79 receives either a B+ polarizing voltage or a B− polarizing voltage through contact arm 84 movable between upper and lower contacts by relay coil 86. This system is based on the fact that when the slope is positive and the sea is increasing or when the slope is negative and the sea is decreasing the sea is from one direction, and when the slope is negative and the sea is increasing or when the slope is positive and the sea is decreasing, the sea is from the opposite direction.

The energization of relay coil 86 may be governed by various conditions in the operation of the system. One condition is whether the sea above a certain transducer is increasing, as on the approach of a crest, or decreasing, as on the approach of a trough. The other condition is whether the slope between that transducer and another transducer of the array is positive or negative. Positive or negative slopes may be simply determined by knowing which return signal arrives back at the transducer first. In order to determine whether the sea is increasing or decreasing a sea height indicator means 87 is provided to obtain an analog voltage proportional to sea height above a certain transducer. The sea height indicator means 87 may operate in a manner similar to the operation to be explained with respect to FIG. 6. The analog voltage provided by the sea height indicator is stored in memory amplifier 88 until a new reading is obtained. An additional memory amplifier 89 is provided to function as a store for an old reading. The old reading is then compared with a new reading from memory amplifier 88 in comparison to means 90 which will provide, upon a compare signal from the signal control circuit 52, and output signal on its upper right-hand output lead if the new reading is greater than the old reading, that is an increasing sea, and will provide an output signal on its lower right-hand output lead if the old reading is greater than the new reading, that is a decreasing sea. The output signal provided by the comparison means 90 is utilized to trigger the flip-flop 92 which may be of the type wherein an input signal on the upper left-hand lead provides a high level output signal on the upper right-hand lead, an input signal on the lower left-hand lead produces a high level signal on the lower right-hand lead. After a comparison is made, a transfer signal is supplied to gating means 94 so that the previous new count becomes the old count for a next comparison.

As was stated, the slope of the wave may be simply determined by examining the return signals at two transducers. If a return signal arrives at a first chosen transducer before it arrives at a second chosen transducer, then a positive slope signal is provided to AND gate 97. If, however, the return signal at the second chosen transducer arrives first, a negative slope signal is supplied to AND gate 98. OR gate 100 therefore will provide energizing current to the relay coil 86 if the sea is increasing and has a positive slope or if the sea is decreasing and has a negative slope. Polarizing winding 82 will then receive a negative voltage. If the sea is increasing with a negative slope or decreasing with a positive slope, OR gate 100 will not supply energizing current to relay coil 86 and polarizing coil 82 will then receive a positive voltage.

In FIG. 1 there is illustrated a system in which sea direction was computed by obtaining an indication of the difference in heights of the sea above three transducers. This type of system is particularly well adapted for deep water operation such as at depths of several hundred feet because the counters just have to indicate a height difference rather than height. For shallow depth operation indication of the sea above each transducer, rather than a difference, may be obtained and interpreted, and to this end reference is made to FIG. 6 in which components similar to those in FIG. 1 have been given like reference numerals.

In FIG. 6 each return signal is utilized to control the condition of only one counter as opposed to two counters. In the FIG. 6 oscillator means 102 is operable to provide timing or counting pulses to the signal control circuit 52 in addition to counters 25, 35 and 45 through AND gates 24, 34 and 44 respectively. In operation, a reset signal from the signal control circuit 52 is utilized to set the counters 25, 35 and 45 to zero and to reset the flip-flops 23, 33 and 43 so as to provide a zero output signal to AND gates 24, 34 and 44 respectively. At this time AND gates 24, 34 and 44 are closed, and the counters do not receive the counting pulses from oscillator 102. A transmit signal from the signal control circuit 52 is utilized to trigger the transmitter 50 in the same manner as was described with respect to FIG. 1 and to also trigger each of the flip-flops 23, 33 and 43 through OR gates 22, 32 and 42 in a manner that each flip-flop will provide a high level enabling signal to the AND gates 24, 34 and 44 thus allowing the counting pulses to be communicative with the counters. As the return signals arrive back at their associated transducers, they are detected and the receiver means 21, 31 and 41 will provide corresponding output signals indicative of the arrival of the return signal in order to turn off respective flip-flops 23, 33 and 43. As soon as the flip-flop is turned off, the associated AND gate is blocked and the associated counter stops counting. Connected with each counter 25, 35 and 45 is a register 29, 39 and 49, respectively, which receives the count from the counter upon a register set signal from the signal control circuit 52 to hold the count until reset whereupon the process is repeated for subsequent readings. The output of the registers 29 and 39 and 49 are fed into digital-to-analog converters 26, 36 and 46 respectively, the output signals from which are fed to indicator means 70.

If the indicator means is a synchro generator, the output signal from one of the digital-to-analog converters may be fed to a memory amplifier such as 88 in FIG. 5 to resolve 180° ambiguity of sea direction. In this respect, the sea height indicator 87 of FIG. 5 may be a single channel version of the three-channel arrangement of FIG. 6.

Although the present invention has been described with a certain degree of particularity, obviously many modifications and variations of the present invention are made possible in the light of the above teachings.

We claim as our invention:
1. A sea direction indicator comprising:
   (A) a plurality of transducers spaced apart and lying in a given plane;
   (B) means for energizing said transducers for producing a corresponding narrow beam acoustic signal, each directed toward the sea surface whereupon corresponding return signals will be produced;
   (C) means for providing a plurality of analog voltages as a function of the arrival of said return signals; and
   (D) indicator means for vectorially combining said analog voltages for obtaining a resultant vector direction.
2. A sea direction indicator according to claim 1 wherein the indicator means includes:
   (A) a synchronous generator including,
      (1) a plurality of stator windings, and
      (2) a rotor member including
         (a) a rotor winding; and
   (B) bias means for applying a predetermined polarity bias signal to said rotor winding.
3. A sea direction indicator comprising:
   (A) first means located below the sea surface for obtaining a first signal proportional to the height of the sea above said first means;
   (B) second means located below the sea surface and spaced from said first means for obtaining a second signal proportional to the height of the sea above said second means;
   (C) third means located below the sea surface and angularly spaced with respect to said first and second means, for obtaining a third signal proportional to the height of the sea above said third means; and
   (D) means for comparing the phase difference between said signals.
4. A sea direction indicator comprising:
   (A) a plurality of transducers spaced apart and lying in a given plane;
   (B) means for energizing said transducers for producing a corresponding narrow beam acoustic signal, each directed toward the sea surface whereupon corresponding return signals will be produced;
   (C) means for receiving said return signals;
   (D) a plurality of counter means, each associated with a particular one of said transducers;
   (E) means for enabling said counters to begin their counting function prior to receipt of said return signals;
   (F) means for timing of individual ones of said counters in response to respective individual ones of said return signals; and
   (G) indicator means for providing an indication of the count in said counter after a last return signal has been received.
5. A sea direction indicator comprising:
   (A) a plurality of transducers spaced apart and lying in a given plane;
   (B) means for energizing said transducers for producing a corresponding narrow beam acoustic signal, each directed toward the sea surface whereupon corresponding return signals will be produced;
   (C) means for producing a first wave profile signal in accordance with a first of said return signals, said first wave profile signal being indicative of the relative height of the sea above the transducer receiving said first return signal;
   (D) means for producing subsequent wave profile signals in accordance with subsequent returns signals, said subsequent wave profile signals being indicative of the relative height of the sea above respective transducers receiving the return signals; and
   (E) means for comparing the phase difference between said wave profile signals.
6. A sea direction indicator according to claim 4 wherein the plurality of transducers comprises 3 transducers arranged in a triangular array and the means for producing the wave profile signals include:
   (A) first, second and third counters;
   (B) means for triggering,
      (1) a first and second of said counters in response to the arrival of a first return signal,
      (2) turning off the second and triggering the third of said counters in response to the arrival of a second return signal,
      (3) turning off the first and third of said counters in response to the arrival of the third return signals; and the means for comparing the phase difference between the wave profile signals includes means for providing an indication of the count in said counters.
7. A sea direction indicator comprising:
   (A) a plurality of transducers spaced apart and lying in a given plane, and each being operable to provide upon proper excitation a narrow beam of acoustic signal directed toward the sea surface whereupon corresponding return signals will be provided;
   (B) the beam axes of said acoustic signal being parallel to one another;
   (C) means for obtaining a plurality of analog voltages proportional to the difference in times of arrival between said return signals, back to respective transducers; and
   (D) means for vectorially summing said analog voltages for obtaining a resultant vector direction.
8. A sea direction indicator according to claim 6 wherein three analog voltages proportional to the difference in times of arrival between the return signals back to the transducers, are obtained.
9. A sea direction indicator comprising:
   (A) three transducers arranged in a triangular array;
   (B) means for energizing each said transducer for producing a narrow beam acoustic signal directed toward correspondingly different areas of the sea surface above said transducers whereupon corresponding returns signals will be produced;
   (C) receiver means for detecting said return signals;
   (D) circuit means responsive to the output signals provided by said receiver means for obtaining a plurality of difference signals, each said difference signal being proportional to the difference in height between two different ones of said areas; and
   (E) indicator means responsive to said difference signals for providing a resultant direction indication.
10. A sea direction indicator comprising:
    (A) a plurality of transducers spaced apart lying in a plane, and each designed for operation at a different frequency than the others of said plurality;
    (B) a transmitter for simultaneously and periodically applying a high voltage pulse to said transducers;
    (C) said transducers being operative in response to said pulse to provide a narrow beam acoustic signal directed toward the sea surface whereupon corresponding return signals will be produced;
    (D) means responsive to said return signals for providing a plurality of wave height signals indicative of the relative height of the sea above said transducers;
    (E) means for vectorially combining said wave height signals for obtaining a resultant vector direction.
11. A sea direction indicator comprising:
    (A) first, second and third transducers arranged in an equilateral triangle, each for transmitting a narrow beam acoustic signal toward the sea surface whereupon three corresponding return signals will be produced;
(B) first, second and third receivers for detecting the arrival of said three return signals respectively;
(C) three counters;
(D) means responsive to a first return signal for turning on two of said counters;
(E) means responsive to a second return signal for turning off one of said turned on counters and turning on the third of said counters;
(F) means responsive to the third return signal for turning off the remaining on counters;
(G) means for converting the count in said counters to respective analog voltages;
(H) a synchro generator having a plurality of windings; and
(I) means for applying each of said analog voltages to a respective one of said windings.

12. A sea direction indicator comprising:
(A) a plurality of transducers spaced apart and lying in a plane;
(B) means for applying electrical signals to said transducers for producing a resulting narrow beam acoustic signal directed toward the sea surface whereupon corresponding return signals will be provided;
(C) said transducers each providing an electrical signal in response to an acoustic return signal;
(D) a plurality of receiver means, each for providing an output pulse in response to the output of an individual one of said transducers;
(E) a plurality of bistable multivibrators, each operable in two stable states, one of said states constituting an on mode of operation;
(F) first gating means for passing the output pulses provided by each said receiver means to respective different parts of multivibrators;
(G) a plurality of counters;
(H) second gating means responsive to an enabling signal and the on state of said multivibrators for turning on respective counters when respective multivibrators are on and for the duration of the on period of the multivibrators;
(I) a plurality of digital-to-analog converters, each responsive to the count in the respective counter for providing a corresponding analog voltage;
(J) means for storing said analog voltages provided by said converters until a new count is to be stored; and
(K) means for vectorially combining said analog voltages.

13. The method of obtaining sea direction comprising the steps of:
(A) projecting, substantially simultaneously, three energy beams at three triangularly spaced apart points on the sea surface;
(B) receiving, at a location, the three beams reflected as a result of step (A);
(C) obtaining three signals dependent upon the relative arrival times of the three reflected beams, at said location; and
(D) vectorially combining said three signals to obtain a resultant vector direction.

References Cited

UNITED STATES PATENTS

| | | | |
|---|---|---|---|
| 3,263,206 | 7/1966 | Brown et al. | 340—3 |
| 3,290,643 | 12/1966 | Padberg | 340—3 |
| 3,296,571 | 1/1967 | Farr et al. | 340—3 |

RICHARD C. QUEISSER, *Primary Examiner.*

JAMES GILL, *Examiner.*

JERRY W. MYRACLE, *Assistant Examiner.*